United States Patent [19]
Takada, deceased

[11] 3,907,227
[45] Sept. 23, 1975

[54] SAFETY BELT RETRACTOR

[75] Inventor: Takezo Takada, deceased, late of Tokyo, Japan, by Juichiro Takada, heir

[73] Assignee: Takata Kojyo Co., Ltd., Tokyo, Japan

[22] Filed: Jan. 25, 1974

[21] Appl. No.: 436,764

[30] Foreign Application Priority Data
Feb. 1, 1973   Japan................................ 48-12412

[52] U.S. Cl. ............................................. 242/107.4
[51] Int. Cl............................................. B65h 75/48
[58] Field of Search........... 242/107.4, 107.6, 107.7; 297/388; 280/150 SB

[56] References Cited
UNITED STATES PATENTS

| | | | |
|---|---|---|---|
| 3,416,747 | 12/1968 | Stoffel............................ | 242/107.4 |
| 3,667,698 | 6/1972 | Fisher............................ | 242/107.4 |
| 3,711,037 | 1/1973 | Jakob............................ | 242/107.4 |
| 3,819,126 | 6/1974 | Stoffel............................ | 242/107.4 |

*Primary Examiner*—Edward J. McCarthy
*Attorney, Agent, or Firm*—Wolder & Gross

[57] ABSTRACT

An automatic locking safety belt retractor includes a spring biased retractor reel having sides ratchet wheels and a shaft journalled between the side legs of a U-shaped bracket which supports a pawl member rockable between ratchet engage and disengage positions and spring biased to disengage position. Mounted on the shaft outside the bracket leg is a rockable internally toothed ratchet wheel, a freely rotatable fly wheel surrounded by the ratchet wheel and carrying a pawl movable into engagement with the ratchet wheel and spring biased out of engagement, a rotatable cam wheel engaging the pawl, a pressure plate 29 and an undulate spring washer entrapped between the pressure plate and cam wheel so that the cam wheel is friction rotated by the shaft rotation. A link connects the pawl member to the internally toothed ratchet wheel so that a rapid belt withdrawal causes the cam wheel to swing the pawl mounted in the high inertia fly wheel to engage the internal ratchet wheel to rock it and the pawl member to lock the reel.

8 Claims, 6 Drawing Figures

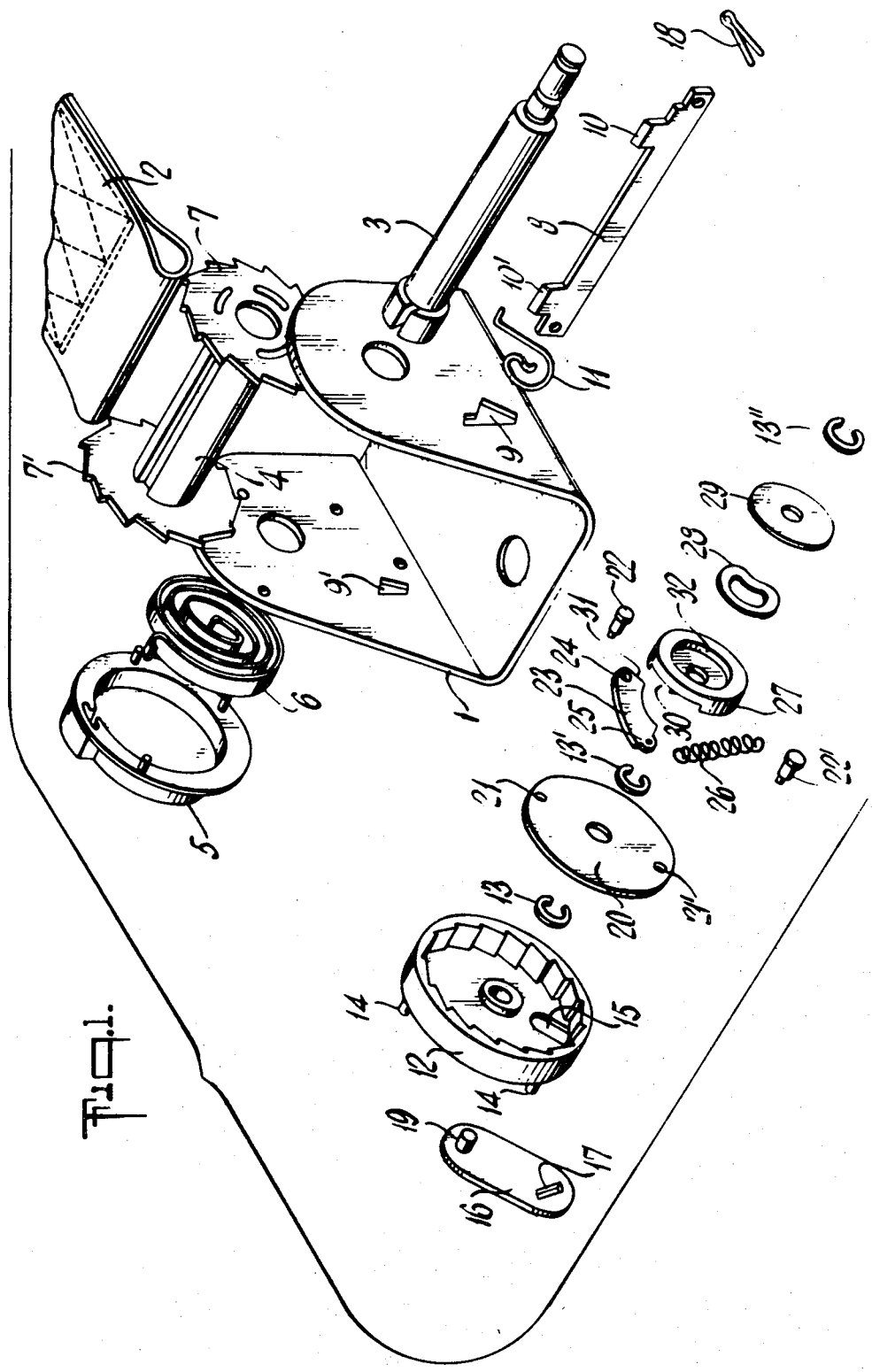

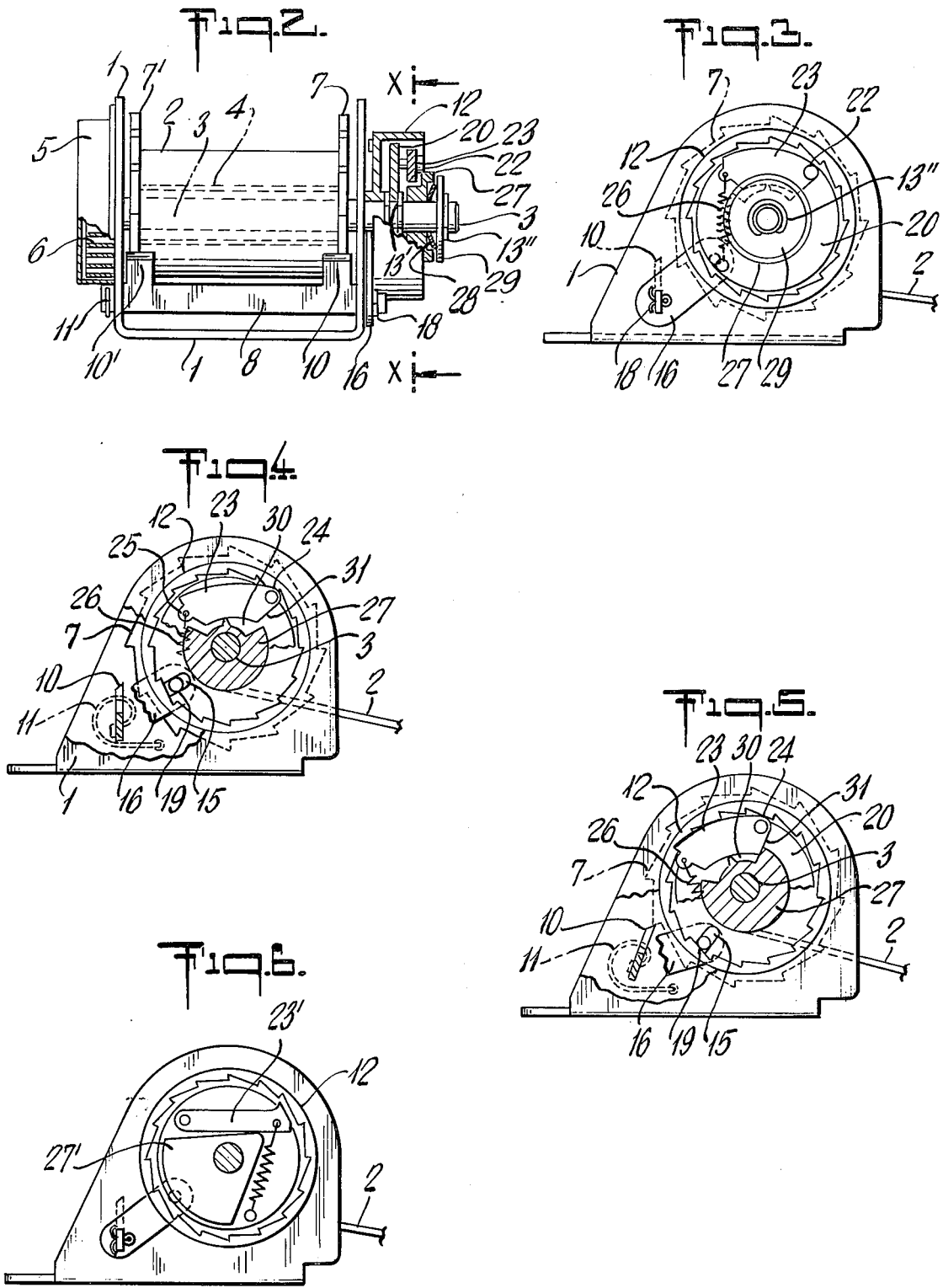

SAFETY BELT RETRACTOR

BACKGROUND OF THE INVENTION

The present invention relates generally to improvements in vehicle safety belt retraction devices and it relates particularly to an improved automatic locking, safety belt retractor reel which responds to a belt withdrawal exceeding a predetermined rate.

In order to restrain a vehicle seat occupant against forward motion in the event of a sharp or rapid slowing of the vehicles forward motion such as that accompanying a collision or similar occurrence while affording free and unhampered movement to the seat occupant under normal vehicle conditions, it is a common practice to take up the safety belt by a spring biased retractor reel which permits free withdrawal of the safety belt except under rapid vehicle deacceleration conditions, under which conditions the reel is automatically locked against belt withdrawal. One type of such reel responds to the belt withdrawal speed exceeding a predetermined rate to lock the reel against further withdrawal. While the reel may respond to any desired belt pull it should advantageously respond to the pull exceeding 0.3G. This type of reel which has been heretofore available possesses numerous drawbacks and disadvantages. They are complicated, bulky expensive devices of limited application, difficult and inconvenient to install and of little versatility and adaptability.

SUMMARY OF THE INVENTION

It is a principal object of the present invention to provide an improved vehicle safety belt retractor.

Another object of the present invention is to provide an improved automatic locking vehicle safety belt retractor reel.

Still another object of the present invention is to provide a safety belt retraction reel which automatically locks against belt withdrawal when the belt is withdrawn under a pull exceeding a predetermined value.

A further object of the present invention is to provide a device of the above nature characterized by its high reliability, great compactness, low cost, ease and convenience of installation and great versatility and adaptability.

In a sense the present invention contemplates the provision of a retractor comprising a spring biased rewind reel including a shaft rotatable therewith, a first ratchet wheel rotatable with the reel, a brake pawl member rockable between ratchet engage and disengage positions and spring biased to a disengage position, and internally toothed second ratchet reel journalled on the shaft and drive coupled to the pawl member to rock it to engage position with the rocking of the second ratchet wheel, a fly wheel carrying an eccentrically mounted second pawl swingable into and out of engagement with the second ratchet and biased to a disengage positions, a cam mounted on the shaft and engaging a follower portion of the second pawl so as to urge the pawl to ratchet engage position upon a predetermined rotation of the cam wheel and means frictionally driving the cam from the shaft.

In its preferred form the reel is journalled between the legs of a U-shaped bracket and the brake control assembly is mounted on the shaft along the outside face of a bracket leg. The second ratchet reel is cap shaped and the fly wheel and second pawl are surrounded by the second ratchet reel. The cam drive means includes a clutch plate mounted on the shaft and an undulate annular spring entrapped and compressed between the confronting faces of the cam and clutch plate.

The improved retractor reel is simple, rugged, reliable, compact and of low cost, a major part of the brake control mechanism being produceable by the injection molding of synthetic polymeric resin, and it is easy, simple and convenient to install and is of great versatility and adaptability.

BRIEF DESCRIPTION OF THE DRAWING

FIG. 1 is an exploded perspective view of a retractor reel embodying the present invention;

FIG. 2 is a partially fragmentary and partially sectional front elevational view thereof;

FIG. 3 is a side elevational view thereof;

FIG. 4 is a sectional view taken along line X—X in FIG. 2;

FIG. 5 is a view similar to FIG. 4 showing the retractor reel in locked condition; and FIG. 6 is a view similar to FIG. 4 of another embodiment of the present invention.

DESCRIPTION OF THE PREFERRED EMBODIMENT

Referring now to the drawings, particularly FIGS. 1 to 5 thereof which illustrate a preferred embodiment thereof, the reference numeral 1 generally designates a U-shaped mounting bracket or frame including side walls having transversely aligned openings in which journalled a shaft 3 which projects beyond the bracket side walls. A reel or hub 4 is carried by and rotatable with shaft 3 and engages the end of a vehicle safety belt 2 which is taken up and withdrawable from reel 4. The reel 4 is resiliently rotated to rewind belt 2 by a spiral spring 6 housed in a shell 5 secured to the outside face of a bracket wall 5 and having its outer end anchored to shell 5 and its inner end secured to shaft 3. Secured to opposite ends of reel 4 proximate the bracket side walls are ratchet wheels 7, 7'. Extending between the side walls of the frame 1 adjacent to the ratchet 7, 7' is a pawl member 8 supported in fan-shaped holes 9, 9' in the frame side walls, and the pawl teeth 10, 10' of the pawl member 8 are movable into and out of engagement with the ratchets 7, 7'. A wire return spring 11 extends between one end of the pawl member 8 and a fixed point to resiliently urge pawl teeth 10, 10' out of engagement with the ratchets 7, 7'. A cap-shaped molded resin internal latch wheel 12 having internal ratchet teeth therein is rotatably mounted and axially restricted by means of an E-ring 13 on a portion of the shaft 3 projecting beyond a side wall of the frame 1. Several spacer projections 14 are arranged on the back of the end base wall of the internal gear latch wheel 12, the internal gear latch wheel 12 being able to smoothly rotate along the side of the frame 1. A radially extending slot 15 is formed in the end base wall of the latch wheel 12. A pawl actuating lever 16 extends between the slot 15 and one end of the pawl member 8 and has a rectangular hole 17 which is engaged to one end of the pawl member 8 and secured thereto by means of a cotter pin 18. A projection 19 on lever 16 opposite to the rectangular hole 17 slidably engages the slot 15 in latch wheel 12. Rotation of latch wheel 12 operates the pawl member 8. A metal inertia or fly wheel 20 journalled on the shaft 3 is disposed inside of the latch wheel 12 by means of an E-ring 13' so that the inertia wheel 20 can rotate freely between the E-rings 13, 13'. The inertia wheel 20 is provided with small holes 21, 21'. A stepped pin 22' is anchored in the small hole 21', and another stepped pin 22 passes through the supporting hole 24 of a pawl or catch 23 and is anchored in the small hole 21. Therefore, the catch 23 can smoothly swing along the surface of the inertia wheel 20. The free end of the catch 23 is provided with a spring catch opening 25, and a pull spring 26 engages and extends between the spring catch opening 25 and the stepped pin 22' to resiliently pull the catch 23 toward a cam wheel 27 as described later. Therefore, under normal conditions, the pawl 23 does not engage the internal ratchet teeth of latch wheel 12. Carried by the shaft 3 are the cam wheel 27, an undulate annular spring 28 and a pressure plate 29 relatively retained in position by means of an E-ring 13''. The cam wheel 27 is made of a synthetic polymeric resin and has fan-shaped recessed, concave cam defining section 30 about as thick as the catch 23 in the surface of the cam wheel facing the inertia wheel 20. When the cam wheel rotates faster than the inertia wheel 20, the cam 30 pushes the cam follower part 31 of the catch 23 to swing the pawl 23 outward so that it engages the internal ratchet of latch wheel 12. The spring 28 partially nests in a circular recess 32 in the outer end face of the cam wheel 27. The circular recess 32 is of such a depth that part of the spring 28 projects beyond the end face of the cam wheel 27. The exposed portion of the spring 28 is compressed by the pressure plate 29 and is secured by means of the E-ring 13''. Accordingly, the cam wheel 27 is secured by the pressure of the E-rings 13', 13'', the cam wheel 27, the pressure plate 29, and the rotation preventing force due to the friction of the shaft 3, the E-ring 13', 13'', the cam wheel 27 and the pressure plate 29. When, as hereinafter described, an excessive rotational force is applied to these parts of the lock mechanism, the cam wheel 27 slides slightly against the shaft 3 to absorb the above mentioned load.

Considering now the operation of the mechanism described above, when the safety belt 2 is pulled out at a normal rate, the following parts rotate with the shaft 3; the reel or drum 4, E-ring 13'', pressure plate 29, circular spring 28, cam wheel 27, E-ring 13' and inertia wheel 20. As shown in FIG. 4, the catch 23 is pulled by the spring 26 and rotates with the inertia wheel 20. Therefore, the pawl member 8 is disengaged from the ratchets 7, 7' by the return spring 11. In emergency, the safety belt 2 is pulled out rapidly by a sudden load exceeding 0.3G, and the shaft 3 begins to rotate suddenly. Under this condition, the heavy metal inertia wheel 20 can freely rotate, and the cam wheel 27 rotates almost as one with the shaft 3, since it is coupled and retained by the above mentioned rotation preventing force. For this reason, the inertia wheel 20 lags the cam wheel 27 in rotation. As shown in FIG. 5, the cam part 30 of the cam wheel 27 engages the cam follower 31 of the catch 23, and the catch 23 is pushed outwardly around the fulcrum hole 24 against the pull of spring 26. Thus the tip of the catch 23 engages a ratchet tooth of the latch wheel 12. The catch 23 is further pushed by the cam wheel 27 to rotate the internal gear latch wheel 12, and the pawl elements 10, 10' of the pawl member 8 engage the ratchets 7, 7' through the pawl lever 16 and the pawl member 8. Under this condition, the pawl teeth 10, 10' first come into contact with the tooth face of the ratchets 7, 7'. For example, in an extreme case, the pawl elements 10, 10' come into contact with the crest of the tooth of the ratchets 7, 7'. Under this condition, the safety belt 2 is further withdrawn until the pawl elements 10, 10' engage the tooth roots of the ratchets 7, 7' with the further rotation of the shaft 3. Accordingly, excessive rotational force forcedly presses the pawl elements 10, 10' into engagement with the tooth faces of the ratchets 7, 7' in the lock mechanism. Thus, the excessive rotational force is absorbed by the slight movement of the cam wheel 27 on the shaft 3 by the rotation preventing force as explained above. As a result, the pawl elements 10, 10' securely engage the ratchets 7, 7' to prevent the withdrawal of the safety belt 2 to safely retain the seat occupants.

In FIG. 6 of the drawing there is illustrated another embodiment of the present invention which differs from that first described only in the shape of the cam wheel and catch pawl. Specifically the cam wheel 27' is in the form of a sector and has an opening proximate its apex engaging the reel shaft. The catch pawl 23' is an elongated lever pivoted at one end to the fly wheel and provided at its other end with a pawl element, a helical spring biasing the free end of catch pawl 23' into engagement with the cam defining apex of cam wheel 27'. The construction and operation of the embodiment shown in FIG. 6 are otherwise similar to those of the embodiment first described.

While there have been described and illustrated preferred embodiments of the present invention, it is apparent that numerous alterations, omissions and additions may be made without departing from the spirit thereof. The improved device is reliable, rugged, compact, simple and of low cost, most of the parts of the brake, pawl control mechanism being produceable to close tolerances by the injection molding thereof from synthetic organic polymeric resins.

What is claimed is:

1. An automatic locking retractor comprising a spring biased retractor reel including a shaft rotatable therewith, a first ratchet wheel rotatable with said reel, a brake first pawl member rockable between positions engaging and disengaging said first ratchet wheel, an internally toothed second ratchet wheel journalled on said shaft, means coupling said second ratchet wheel to said first pawl member to rock said pawl member to first ratchet wheel engage position with a predetermined rotation of said second ratchet reel, a fly wheel freely rotatable on said shaft, a second pawl member mounted on said fly wheel and rockable between positions engaging and disengaging said second ratchet wheel and spring biased to a ratchet disengage position and including a follower portion and a cam member mounted on and rotatable by said shaft in engagement with said follower portion to shift said second pawl member into engagement with said second ratchet wheel upon said fly wheel lagging the rotation of said cam member whereby to rock said second ratchet wheel and advance said first pawl member into engagement with said first ratchet wheel.

2. The retrator of claim 1 wherein said second ratchet wheel is cap shaped, including an end wall having a central bearing defining opening engaging said shaft.

3. The retractor of claim 2 wherein said second ratchet wheel end wall has a radially extending slot formed therein and said coupling means comprises an arm extending transversely from said first pawl member and being rockable therewith and a pin mounted on said arm spaced from said first pawl member and slideably engaging said slot.

4. The retractor of claim 1 wherein said fly wheel and second pawl are surrounded by and located within said second ratchet wheel.

5. The retractor of claim 1, including a friction drive means coupling said cam to said shaft and comprising a pressure plate mounted on said shaft and an undulate annular spring coaxial with said shaft and entrapped between and compressed by confronting faces of said cam wheel and pressure plate.

6. The retractor of claim 5 wherein said cam member comprises a cam wheel having a circular well formed in the face thereof confronting said pressure plate, said annular spring nesting in and projecting beyond said well.

7. The retractor of claim 1 comprising a U-shaped bracket including opposite side legs, said retractor reel and shaft being journalled between and said shaft projecting beyond said side legs and said second ratchet wheel, fly wheel, second pawl member, cam wheel and coupling means being positioned along an outside face of one of said bracket side legs.

8. An emergency locking belt take-up device comprising a U-shaped frame,
a pawl lever provided on the outside of one leg of said U-shaped frame,
an internal gear latch wheel,
an inertia wheel,
a cam wheel,
a corrugated coil spring,
a pressure plate,
a catch provided on said inertia wheel,
a pair of ratchets mounted within and proximate the inside of both legs of said frame and
a pawl across between said frame legs and adjacent to said ratchets, and characterized in that:
on the emergent rapid speed changes of vehicle experienced, said catch supported, by said inertia wheel engages securely said internal gear latch wheel without excessive resistance to have said internal gear latch wheel rotationally driven by said catch with the cause of slower operational revolving inertia wheel than said cam wheel revolution and said cam wheel rotation frictionally braked by said pressure plate and said corrugated coil spring to result in having said internal gear latch wheel turned by said catch for making said pawl engaging ratchet through said pawl lever and said pawl itself and finally to prevent withdrawing of said safety belt for protecting the seat occupant by said restraining, but one the other normal running of vehicle, said safety belt being taken up and withdrawn without resistance.

* * * * *